United States Patent
Weber et al.

(10) Patent No.: US 7,538,969 B2
(45) Date of Patent: May 26, 2009

(54) SERVO PATTERN WITH ENCODED DATA

(75) Inventors: Mark P. Weber, Oakdale, MN (US);
Alan R. Olson, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 294 days.

(21) Appl. No.: 11/508,508

(22) Filed: Aug. 23, 2006

(65) Prior Publication Data
US 2008/0049356 A1    Feb. 28, 2008

(51) Int. Cl.
*G11B 5/584*    (2006.01)
(52) U.S. Cl. .................................. 360/77.12
(58) Field of Classification Search .............. 360/77.12, 360/121, 48
See application file for complete search history.

(56) References Cited
U.S. PATENT DOCUMENTS

| | | | |
|---|---|---|---|
| 6,049,438 A | 4/2000 | Serrano et al. | |
| 6,141,176 A | 10/2000 | Blaum et al. | |
| 6,710,967 B2 * | 3/2004 | Hennecken et al. | 360/77.12 |
| 6,744,594 B2 * | 6/2004 | Denison et al. | 360/121 |
| 6,781,778 B1 | 8/2004 | Molstad et al. | |
| 6,906,887 B2 | 6/2005 | Nakao | |

* cited by examiner

*Primary Examiner*—Fred Tzeng
(74) *Attorney, Agent, or Firm*—Eric D. Levinson

(57) ABSTRACT

Data storage tape comprises one or more data tracks and a servo band. The servo band stores a plurality of servo patterns within a servo frame to facilitate head positioning relative to the data tracks. Spacings between the servo patterns within the servo frame vary to encode information in the servo frame. A number of bits in the information is greater than a number of servo patterns within the frame. Servo patterns in different servo bands on the data storage tape may be different to provide band identification information. The different servo patterns of the different servo bands may allow lateral position calculations using the same formula for each servo pattern.

22 Claims, 6 Drawing Sheets

SERVO PATTERN WITH ENCODED DATA

This invention was made with United States Government support under Cooperative Agreement No. 70NANB2H3040 awarded by the National Institute of Standards and Technology (NIST), Advanced Technology Program. The United States Government has certain rights in this invention.

TECHNICAL FIELD

The invention relates to data storage media and, more particularly but without limitation, to magnetic storage media recorded with servo patterns.

BACKGROUND

Data storage media are commonly used for storage and retrieval of data and come in many forms, such as magnetic tape, magnetic disks, optical tape, optical disks, holographic disks or cards, and the like. In magnetic media, data is typically stored as magnetic signals that are magnetically recorded on the medium surface. The data stored on the medium is typically organized along "data tracks," and transducer heads are positioned relative to the data tracks to read or write data on the tracks. A typical magnetic storage medium, such as magnetic tape, usually includes several data tracks. Optical media, holographic media and other media formats can also make use of data tracks.

During data storage and recovery, the transducer head must locate each data track, and follow the path of the data track accurately along the media surface. In order to facilitate precise positioning of the transducer head relative to the data tracks, servo techniques have been developed. Servo patterns refer to signals or other recorded marks on the medium that are used for tracking purposes. In other words, servo patterns are recorded on the medium to provide reference points relative to the data tracks. A servo controller interprets a detected servo pattern and generates a position error signal (PES). The PES is used to adjust the lateral distance of the transducer head relative to the data tracks so that the transducer head is properly positioned along the data tracks for effective reading and/or writing of data to the data tracks.

With some data storage media, such as magnetic tape, the servo patterns are stored in specialized tracks on the medium, called "servo bands." Servo bands serve as references for the servo controller. A plurality of servo patterns may be defined in a servo band. Some magnetic media include a plurality of servo bands, with data tracks being located between the servo bands.

The servo patterns recorded in the servo bands may be sensed by one or more servo heads. Once the servo head locates a particular servo band, one or more data tracks can be located on the medium according to the data track's known displacement from the servo band. The servo controller receives detected servo signals from the servo heads and generates PESs, which are used to position a read/write head accurately relative to the data tracks.

One type of servo pattern is a time-based servo pattern. Time-based servo techniques refer to servo techniques that make use of non-parallel servo marks and time variables or distance variables to identify head position. The time offset between the detection of two or more servo marks can be translated into a PES, which defines a lateral distance of the transducer head relative to a data track. For example, given a constant velocity of magnetic tape formed with servo pattern "/ \", the time between detection of mark "/" and mark "\" becomes longer when the servo head is positioned towards the bottom of pattern "/ \" and shorter if the servo head positioned towards the top of pattern "/ \". Given a constant velocity of magnetic media, a defined time period between detected servo signals may correspond to a center of pattern "/ \". By locating the center of pattern "/ \", a known distance between the center of the servo band and the data tracks can be identified. Time-based servo patterns are also commonly implemented in magnetic tape media, but may be useful in other media.

SUMMARY

In general, the invention is directed to servo techniques that encode data into time-based servo patterns. The described techniques include varying spacing of servo patterns within a servo frame to encode digital data. Also described are techniques for varying the overall width of servo patterns in different servo bands. These techniques may be used to, e.g., encode band identification information in the servo marks.

In one embodiment, the invention is directed to data storage tape comprising one or more data tracks and a servo band that stores a plurality of servo patterns within a servo frame to facilitate head positioning relative to the data tracks. Spacings between the servo patterns within the servo frame vary to encode information in the servo frame. A number of bits in the information is greater than a number of servo patterns within the frame.

In another embodiment, the invention is directed to data storage tape comprising at least one data track, a first servo band including a first servo pattern having a first length in a direction of travel of the data storage tape and a second servo band including a second servo pattern having a second length in the direction of travel of the data storage tape. The first length identifies the first servo band and the second length identifies the second servo band.

In an embodiment, data storage tape comprises a plurality of fixed-position servo patterns that identify locations of a plurality of servo frames and a plurality of variable-position servo patterns. Each of the plurality of variable-position servo patterns encode more than one bit of information according to their positions within the plurality of servo frames as defined by the plurality of fixed-position servo patterns.

In another embodiment, the invention is directed to data storage tape comprising a servo frame including a servo pattern. The servo pattern includes a first pair of parallel servo marks, a second pair of parallel servo marks, wherein the second pair of parallel servo marks is non-parallel to the first pair of parallel servo marks, and a zigzag servo mark. The zigzag servo mark includes portions that are parallel to the first pair of servo marks and other portions that are parallel to the second pair of servo marks.

Various aspects of the invention can provide a number of advantages. In general, embodiments of the invention provide techniques for encoding data in servo patterns in a concentration of more than one bit of data per servo pattern. Embodiments of the invention also provide different servo patterns that allow use of the same lateral position calculation formula. This means that a data storage media may include more than one shape of servo pattern and that shape does not need to be identified to calculate a position of a read head relative to the data storage media.

The details of several embodiments of the invention are set forth in the accompanying drawings and the description below. Other features, objects, and advantages of the invention will be apparent from the description and drawings, and from the claims.

DETAILED DESCRIPTION

Figure 1:
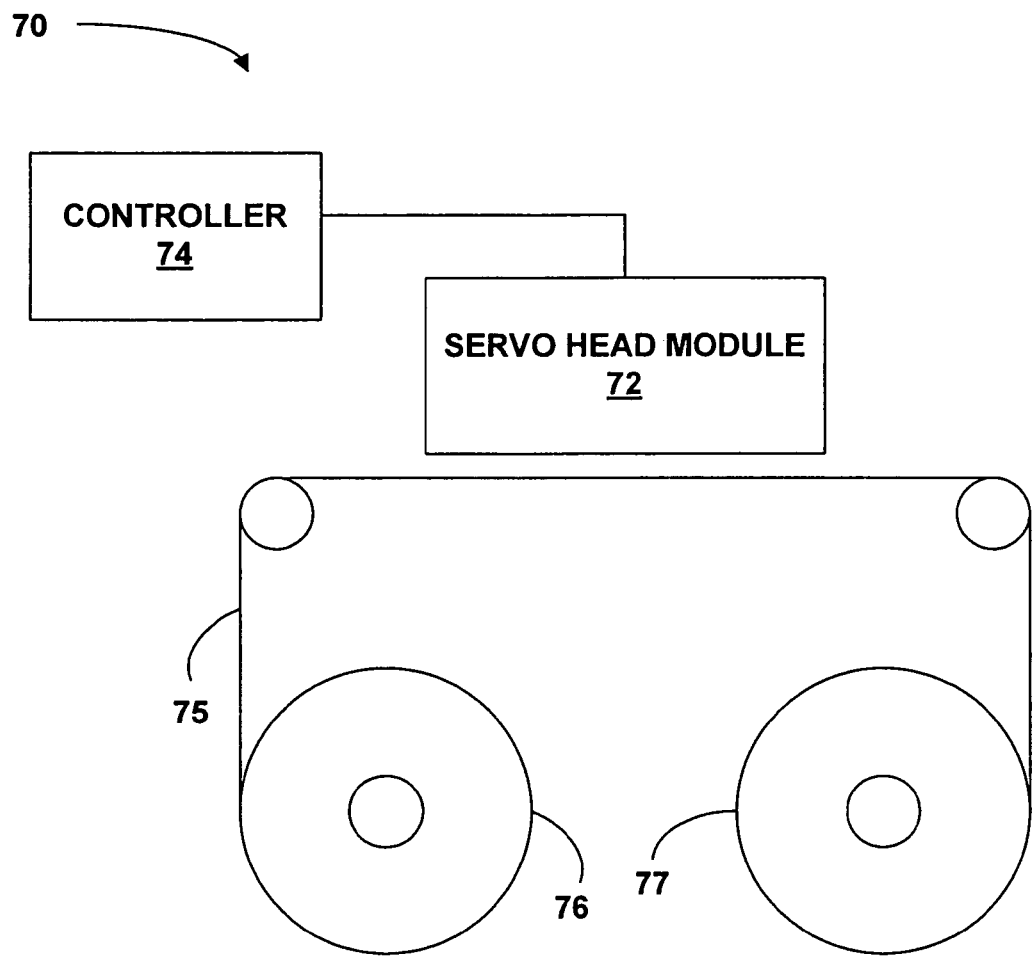
FIG. 1 is a block diagram illustrating an exemplary servo writing system for prerecording servo patterns on magnetic tape.

FIG. 1 is a block diagram illustrating an exemplary servo writing system 70 for pre-recording servo patterns on magnetic tape 75. System 70 includes servo head module 72, servo controller 74, and magnetic tape 75 spooled on spools 76 and 77. Servo head module 72 contains one or more servo heads to write servo patterns on magnetic tape 75. Controller 74 controls the magnetic fields applied by the one or more servo heads of servo head module 72. Magnetic tape 75 feeds from spool 76 to spool 77, passing in close proximity to servo head module 72. For example, magnetic tape 75 may contact the one or more servo heads of servo head module 72 during servo recording.

Servo head module 72 comprises electromagnetic elements that generate magnetic fields. In one embodiment, controller 74 may cause a first servo head to write substantially over the full servo band associated with magnetic tape 75. Then, controller 74 can cause at least one additional servo head within servo head module 72 to selectively erase servo marks within the prerecorded servo band.

In a different embodiment, the servo band portion of magnetic tape 75 may be randomly magnetized. Controller 74 may cause at least one servo head within servo head module 72 to write servo marks within a randomly magnetized servo band. In some embodiments, servo head module 72 may include a servo head for every servo band. The servo head for a servo band may provide a servo pattern unique to that servo band such the identification of each servo band can be readily determined. For example, the width of servo patterns may be different for every band. Also, the distances between servo frames may also be varied. Furthermore, the distances between servo patterns within a servo frame may be varied to encode data. In these ways, servo head module 72 allows for inherent servo band identification and also for encoding other information within servo frames, such as manufacturer information and linear position (LPOS) information.

Figure 2A:
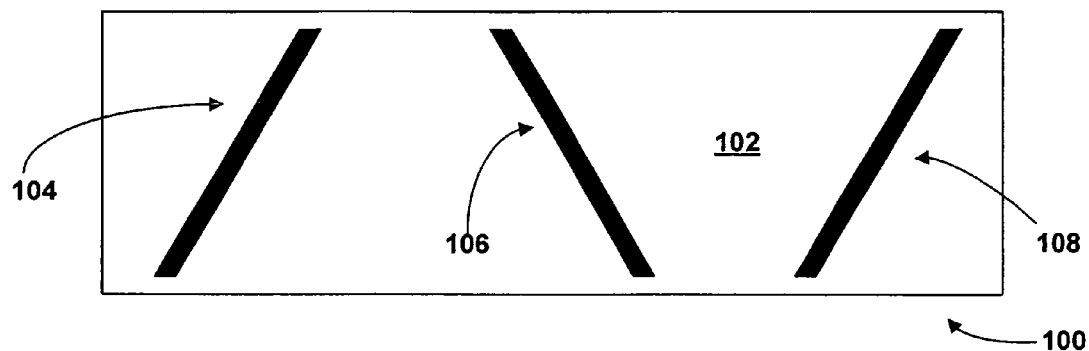
FIG. 2A is a top view of an exemplary servo head.
Figure 2B:
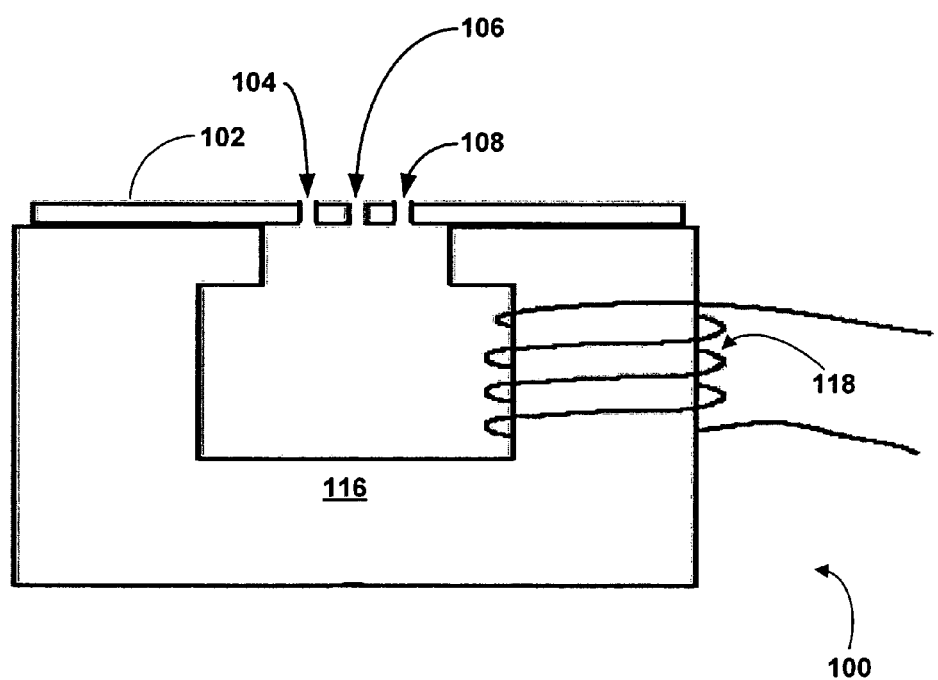
FIG. 2B is a side view of the exemplary servo head illustrated in FIG. 2A.

FIG. 2A is a top view of exemplary servo head 100 comprising write gaps 104, 106 and 108. FIG. 2B is a cross-sectional conceptual view of the exemplary servo head illustrated in FIG. 2A. Servo head 100 is configured to record a servo pattern on magnetic media. For example, servo head 100 may be a part of servo head module 72 in FIG. 1.

Controller 74 (FIG. 1) applies electrical signals to servo head 100 via coil 118 in order to generate magnetic fields across gaps 104, 106 and 108. For example, electric pulses may be applied to servo head 100 via coil 118 in order to generate magnetic fields across gaps 104, 106 and 108. A single electrical pulse records a single N-shaped servo pattern consisting of three servo marks: one servo mark for each of gaps 104, 106 and 108.

In operation, servo head 100 generates timed pulses of magnetic signals to write gaps 104, 106 and 108 as the magnetic tape passes relative servo head 100. With the magnetic tape moving relative to servo head 100, the timed pulses of magnetic fields from write gaps 104, 106 and 108 leave recorded servo marks to create a servo frame on the magnetic tape, similar to servo frame 12A in FIG. 3, for example. If desired, additional servo heads may be used with servo head 100 for simultaneous creation of servo frames on additional servo bands.

Servo head 100 may be manufactured using micromanufacturing techniques such as deposition, masking and etching. For example, magnetic layer 102 may be formed or etched to define gaps 104, 106 and 108, that in turn define the servo pattern. Magnetic layer 102 may comprise a magnetically permeable layer that is deposited over electromagnetic element 116 via masking techniques to define a pattern of gaps as described herein. Alternatively, magnetic layer 102 may comprise a magnetically permeable layer deposited over electromagnetic element 116 and then etched to define patterns of gaps. Also, magnetic layer 102 may be pre-formed to define the gaps and then adhered to electromagnetic element 116 to define servo head 100. In other embodiments, gaps 104, 106 and 108 may be formed directly in electromagnetic element 116 to define the servo pattern to be created by servo head 100.

Figure 3:
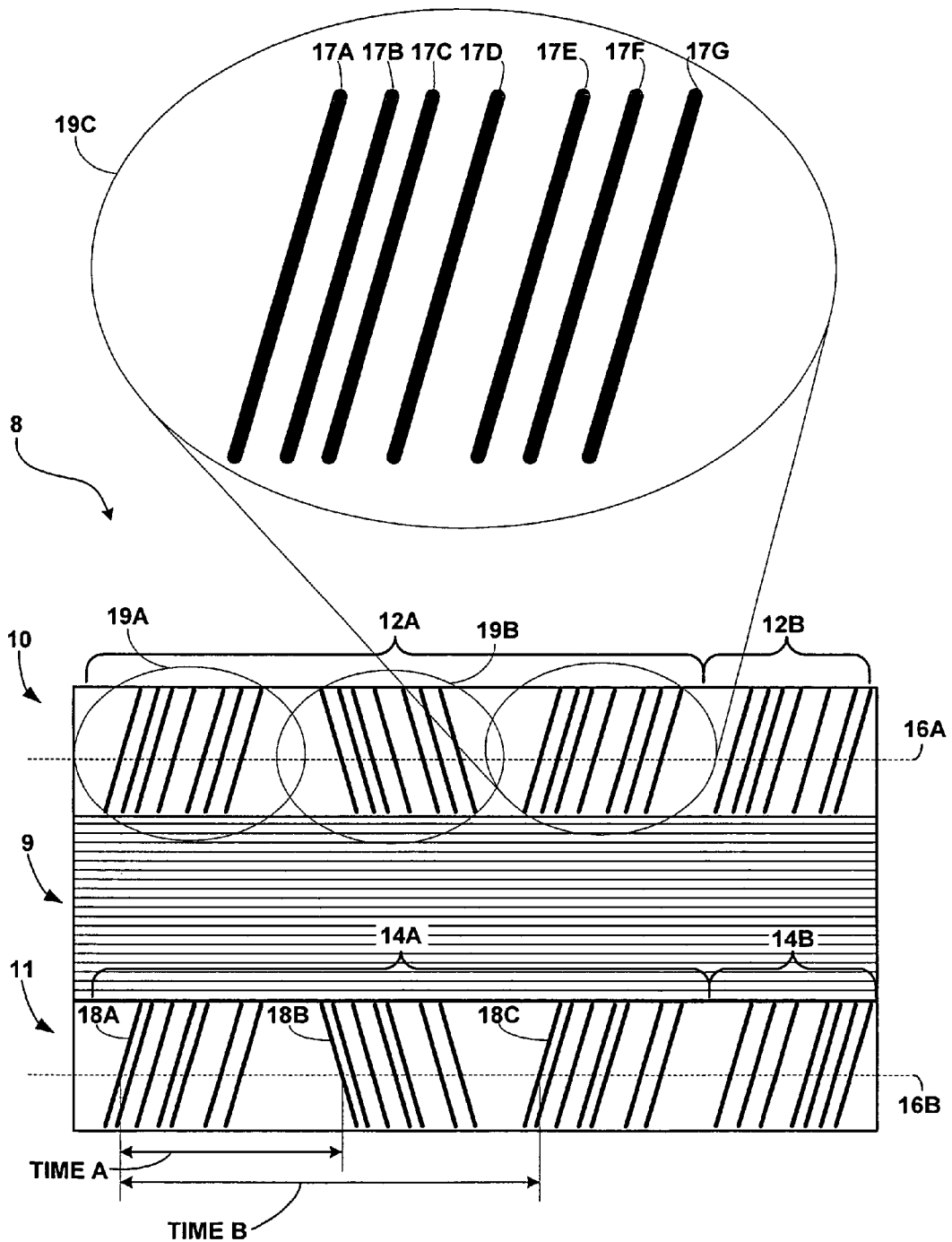
FIG. 3 is an illustration of a portion of a linear data storage media including sets of N-shaped servo patterns that encode data.

FIG. 3 is a conceptual view illustrating data storage tape 8 including data tracks 9, servo band 10 and servo band 11. As referred to herein, a servo mark is a continuous shape that can be sensed as a read head passes over a media surface. Time-based servo marks are generally lines, but not necessarily straight lines; e.g., in some embodiments, time-based servo marks may have zigzag or curved shapes. With respect to magnetic tape, a servo mark is generally written by a single write gap in a servo head with a single electromagnetic pulse. The term servo marks encompasses servo stripes, which are straight, and also includes curved servo marks and servo marks with other shapes.

A servo pattern includes a plurality of servo marks. The plurality of servo marks in a single time-based servo pattern allows calculation of a position error signal (PES) using time measurements between the detection of servo marks within the pattern by a read head. Generally, all servo marks within a single servo pattern are written using a single electromagnetic pulse so that any inconsistency in tape speed during the servo writing does not affect the spacing of servo marks within a servo pattern. As referred to herein, a servo frame includes at least one servo pattern; although servo frames often include more than one servo pattern. As an example, servo band 10 includes servo frames 12A-12B ("frames 12"). Each of servo frames 12 includes seven servo patterns. Servo patterns in servo frames having more than one servo pattern are generally written with the same servo head using one electromagnetic pulse for each servo pattern in the servo frame. For example, each of servo frames 12 was written using seven electromagnetic pulses.

Commonly shaped adjacent servo marks of separate servo patterns within a servo frame are generally written using the same write gap. These commonly shaped adjacent servo marks of separate servo patterns within a servo frame are referred to herein as a burst. The term burst is in reference to the signal detected as a head passes over the servo marks that make up a burst. For example, servo frame 12A includes bursts 19A-19C. In some embodiments, servo frames may overlap, as can servo marks, servo patterns and bursts. For simplicity, no overlapping servo marks, servo patterns, bursts or servo frames are shown in FIG. 3.

Servo frames 12 each include seven N-shaped servo patterns; each N-shaped servo pattern includes three servo marks. Frame 12B is incomplete as it extends beyond the portion of data storage tape 8 shown in FIG. 3. All of the servo patterns in servo band 10 were written by the same servo write head and are substantially identical. Servo band 11 also includes two servo frames: 14A-14B ("frames 14"). Each of frames 14 also includes seven N-shaped servo patterns; again only a portion of servo frame 14B is shown in FIG. 3. As with servo band 10, all of the servo patterns in servo band 11 were written by the same servo write head and are identical. The servo patterns in servo band 10 are shown as being identical to the servo patterns in servo band 11; in other embodiments, each servo band may have a unique servo pattern. The seven N-shaped servo patterns of servo frame 12A form three bursts 19A-19C ("bursts 19"). For illustration proposes, FIG. 3 also includes a close-up view of burst 19 of servo frame 12A. Burst 19C includes servo marks 17A-17G ("servo marks 17").

The N-shaped servo patterns in servo bands 10 and 11 facilitate positioning of a read head relative to data tracks 9, which reside a known distance from servo bands 10 and 11. The location of a read head along one of head paths 16A and 16B ("paths 16") is determined by measuring the time between detection of marks forming an N-shaped servo pattern. Servo marks 18A-18C ("servo marks 18") form the first servo pattern in servo frame 14A. As data storage tape 8 passes by a read head located along head path 16B, the read head first detects servo mark 18A. The next servo mark in the first servo pattern of servo frame 14A detected by the read head is servo mark 18B. The time between the detection of servo mark 18A and servo mark 18B is shown as "TIME A" in FIG. 3. From this measurement, the position of the read head within servo band 11 can be determined because the distance between servo marks 18A and 18B varies as a function of the lateral position of the path of the read head. For example, if head path 16B were closer to data tracks 9, TIME A would be shorter. Likewise, if head path 16B were further from to data tracks 9, TIME A would be greater.

The relationship between the measured TIME A and the position of the read head within servo band 11 is dependent on the tape speed of data storage tape 8 as it passes over the read head. Servo mark 18C is used to account for tape speed fluctuations. More specifically, because servo marks 18A and 18C are parallel, "TIME B", the time between the detection of servo marks 18A and 18C, can be used to measure tape speed. The ratio of TIME A to TIME B allows an accurate calculation of the location of head path 16B.

By locating the positions of head paths 16 relative to servo bands 10 and 11, a PES can be generated to identify lateral positioning error of the read head relative to the data track(s). While PES calculations require only a single N-shaped servo pattern, data from multiple servo patterns within a servo band may be combined to improve accuracy of a PES. Each of the servo patterns in servo band 10 is substantially identical to each other, and the servo patterns in servo band 11 are also substantially identical to each other. This means that the same PES calculation formula may be used for every servo pattern in a servo band.

The servo patterns within a servo band may also be used to encode data in the servo band. Encoded data may include linear position information, manufacturer information, track identification and/or other information. In data storage tape 9, the spacing between the servo patterns in each of servo frames 12 and 14 varies to encode data. Each servo frame includes three bursts that correspond to the three servo marks of each of the N-shaped servo patterns. For example, servo frame 12A includes bursts 19A, 19B and 19C (bursts 19). Each of the seven servo patterns in servo frame 12A is substantially identical. For this reason, the spacing of servo marks in burst 19A is substantially the same as the spacing of servo marks in bursts 19B and 19C. The spacing between servo marks in each of bursts 19 is shown in detail in the close-up view of burst 19C.

Burst 19C includes servo marks 17. Servo marks 17A and 17G are part of fixed-position servo patterns, i.e., these servo patterns are located in known positions for each of servo frames 12. For example, the fixed-position servo patterns may be located in the same position in each of servo frames 12. The fixed-position servo patterns in a servo frame are used to locate the position of a servo frame. Parallel servo marks within a servo pattern can be used to normalize the measured time between reading non-parallel servo marks to account for fluctuations in tape speed during the writing of servo marks on data storage tape 8. The first and the last servo patterns in a servo frame are used as fixed-position servo patterns because they are spaced the furthest apart, which provides a more accurate write tape speed velocity correction. In contrast, servo marks 17B-17F are part of variable-position servo patterns, i.e., the positions of these servo patterns relative to the fixed-position servo patterns vary from one servo frame to the next in order to encode data. Each of servo marks 17B-17F encodes more than one bit of data according to its position relative to the fixed position servo marks 17A and 17G.

As a specific example, each of servo marks 17 may have a width of two micrometers in the direction parallel to head paths 16, which is also the direction of travel of data storage tape 8. Furthermore, each of servo marks 17 may have a nominal linear position (LPOS) spacing of five micrometers from one another, i.e., the total distance between the center of servo marks 17A and 17G is thirty micrometers. Servo marks 17B-17H are located within this thirty micrometer distance in a non-overlapping fashion. One technique for encoded data within servo marks 17 is to assign values to potential LPOS of servo marks relative to nominal LPOS (five micrometer spacing) and assign a digital value to each LPOS. Exemplary values that could be used to utilize this technique are given in Table 1.

TABLE 1

| 3-bit value | Spacing relative to nominal (micrometers) |
|---|---|
| 000 | −0.875 |
| 001 | −0.625 |
| 010 | −0.375 |
| 011 | −.0125 |
| 100 | 0.125 |
| 101 | 0.375 |
| 110 | 0.625 |
| 111 | 0.875 |

Table 1 provides a total of eight possible LPOS for each of variable-position servo marks 17B-17F using 0.250 micrometer LPOS increments. The spacing values of Table 1 ensure that no overlap occurs among servo marks 17B-17F. At a minimum, with five micrometer nominal spacing and two micrometer wide servo marks, using the spacing from Table 1 provides a minimum of 1.25 micrometers between adjacent servo marks in servo burst 19C.

Using the values from Table 1, the positions of each of servo marks 17B-17F represent three bits of data. With the five variable-position servo marks 17B-17F, servo burst 19C represents a total of fifteen bits of data. The spacing between servo marks in each of bursts 19 is the same; therefore, each of bursts 19 redundantly encode the same data such that the seven servo patterns of servo frame 12 encode a total of fifteen bits of data. This redundancy may be useful to reduce the error rate during the reading of encoded data. Servo frames 12B and 14 may each encode an additional fifteen bits of data.

While the described techniques use the same number of servo patterns in every servo frame to encode data, it is also possible to have a variable number of servo patterns to encode data. This may allow an increase in the number of bits that may be encoded in a servo frame because more complex encoding techniques may be used. Furthermore, in some embodiments, the same information may be encoded coincidently in separate servo bands of a data storage tape. This would allow each servo band to be written using a single write driver.

Figure 4:
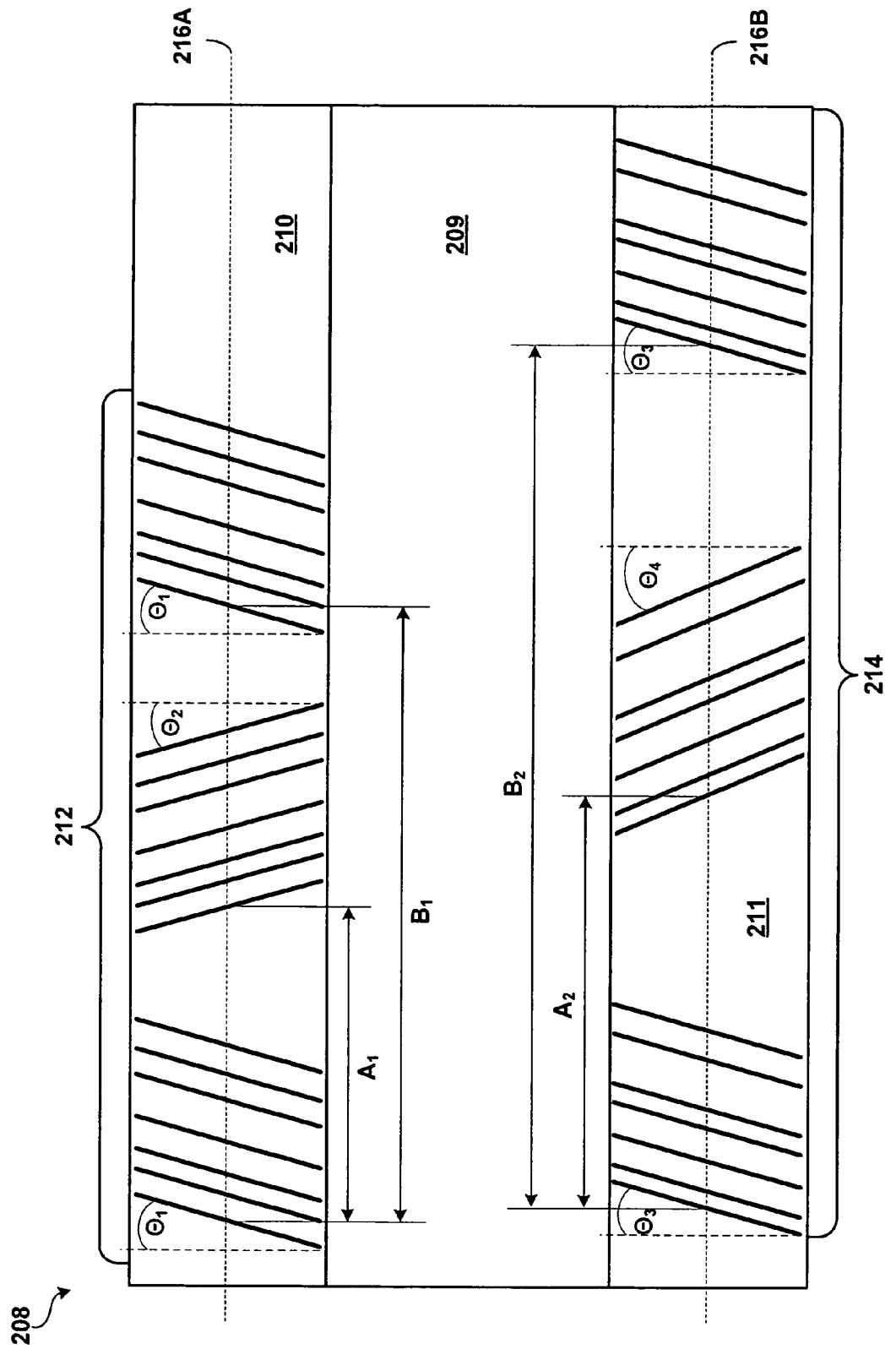
FIG. 4 is an illustration of a portion of a linear data storage media including N-shaped servo patterns with different widths in different tracks to encode band identification in addition to other data.

FIG. 4 is a conceptual view illustrating data storage tape 208 including data tracks 209, servo band 210 and servo band 211. Servo band 210 includes servo frames 212; servo band 211 includes servo frame 214. Each of frames 212 and 214 also include seven N-shaped servo patterns. The first and last servo pattern in each of servo frames 212 and 214 are fixed-position servo patterns, while the other servo patterns are variable-position servo patterns to encode data in servo bands 210 and 211. Data storage tape 208 is similar to data storage tape 8 of FIG. 3 with the exception that servo patterns in servo band 210 are different than the servo patterns in servo band 211. For brevity, many aspects of data storage tape 208 that are the same as data storage tape 8 are not repeated with respect to data storage tape 208.

All of the servo patterns in servo band 210 were written by the same servo write head and are identical. Likewise, all of the servo patterns in servo band 211 were written by the same servo write head and are identical. However, the servo patterns in servo band 211 have a length in a direction parallel to the direction of travel of data storage tape 208 that is greater than the length of the servo patterns in servo band 210. The different lengths of the servo bands in servo band 211 compared to servo band 210 encode additional data in servo bands 210 and 211. For example, the lengths of servo bands 210 and 211 may represent servo band identifications of servo bands 210 and 211.

Even though the servo patterns in servo bands 210 and 211 are different, the PES calculation formula is the same for servo patterns in servo bands 210 and 211. This means that a PES can be calculated without having to first identify a servo band.

In order for servo patterns in servo bands 210 and 211 to use the same PES calculation formula the following relationships must be maintained:

[0]

$$\frac{A_1}{A_2} = \frac{B_1}{B_2} \quad \text{(Equation 1)}$$

-continued $$\frac{\tan(\Theta_1) + \tan(\Theta_2)}{B_1} = \frac{\tan(\Theta_3) + \tan(\Theta_4)}{B_2} \quad \text{(Equation 2)}$$

Equation 1 dictates that the location of the middle servo marks of the repeated servo pattern shape in servo band 211 needs to be proportionally related to the location of the middle servo marks of the repeated servo pattern shape in servo band 210, e.g., if the middle servo marks of the servo patterns in servo band 210 are centered between the first and last servo marks along head path 216A, the middle servo marks of servo patterns in servo band 211 also needs to be centered between the first and last servo marks along head path 216B. Equation 2 provides a relationship among $\Theta_1$, $\Theta_2$, $\Theta_3$ and $\Theta_4$ to maintain the proportionality of Equation 1 for every longitudinal head path position.

Figure 5:
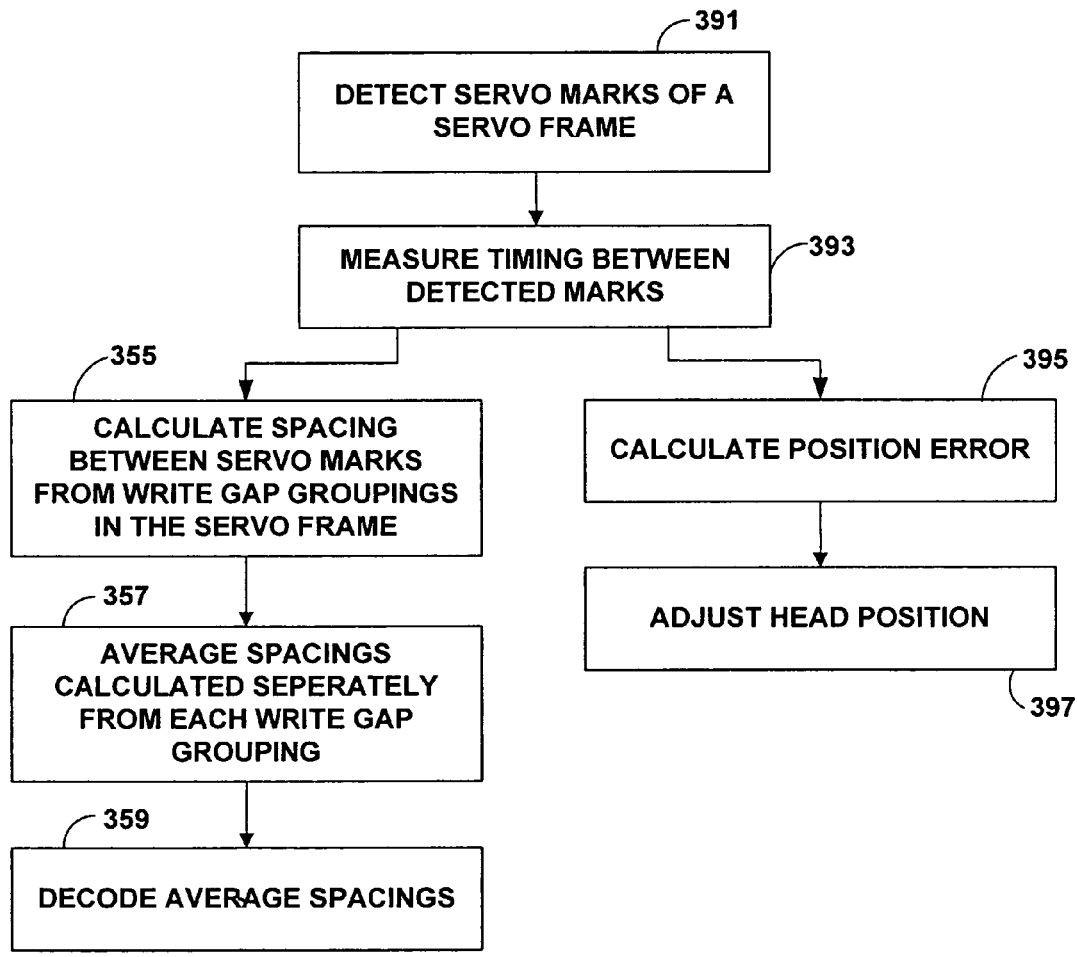
FIG. 5 is a flow diagram illustrating techniques for adjusting a read head's position and decoding data within a servo band by measuring the time between detection of servo marks on a data storage tape.

FIG. 5 is a flow diagram illustrating techniques for adjusting a read head's position and retrieving data encoded within a servo band by measuring the time between detection of servo marks on a data storage tape. For illustration purposes, the techniques shown in FIG. 5 are described with reference to data storage tape 8 of FIG. 3.

Data storage tape 8 passes the read head (not shown in FIG. 3) located along head path 16A relative to data storage tape 8. As data storage tape 8 passes the head, the head first detects the servo marks in burst 19A, followed by the servo marks in bursts 19B and 19C (391). As the section of data storage tape 8 including servo frame 19C passes the head, a controller (not shown in FIG. 3) measures the timing between detected marks (393). There are a total of twenty-one marks in servo frame 12A, and the controller stores the timing of each of these servo marks. Because each servo mark causes the same signal response in the head, the controller counts each mark to determine its significance. For example, the controller knows that the first mark in servo frame 12A combines with the eighth mark and the fifteenth mark (servo mark 17A) to form the first servo pattern. Using the timing of marks from each servo pattern, the controller calculates a position error for the head as previously described with respect to FIG. 3 (395). For example, the controller may average position errors calculated from the timing of the marks from each of the servo patterns in servo frame 12A. The controller then uses the calculated position error of the head to adjust the lateral position of the head relative to data storage tape 8 (397).

In addition to determining position error, the controller simultaneously decodes data stored in servo fame using the timing of the detection of the servo marks. The controller measures the distance between the servo marks of the first and the last servo patterns in servo frame 12A, e.g., the first and the last servo patterns in servo frame 12A may be thirty micrometers apart. This measured distance may be used to account for tape velocity fluctuations during the writing of servo frame 12A. The controller accounts for tape speed fluctuations during the reading of servo marks by measuring the time between parallel servo marks of the same servo pattern. The controller uses the timing between the detection of the first and the last servo mark in each of bursts 19 to account for tape speed fluctuations separately for each of bursts 19. The controller then calculates the positions of the middle five servo marks for each of bursts 19 separately (355). The controller averages the calculated spacings from each burst 19 (357). The calculated average spacings of the separate servo marks improves the accuracy of the spacing calculation for each servo pattern compared to using only a single one of bursts 19 to determine the spacings of the servo patterns in servo frame 12A. Next the controller correlates the location of each of the middle five servo patterns with bits of information (359). An example of this correlation is shown in Table 1. For example, each of the five servo patterns may represent two, three, four or more bits.

Figure 6A:
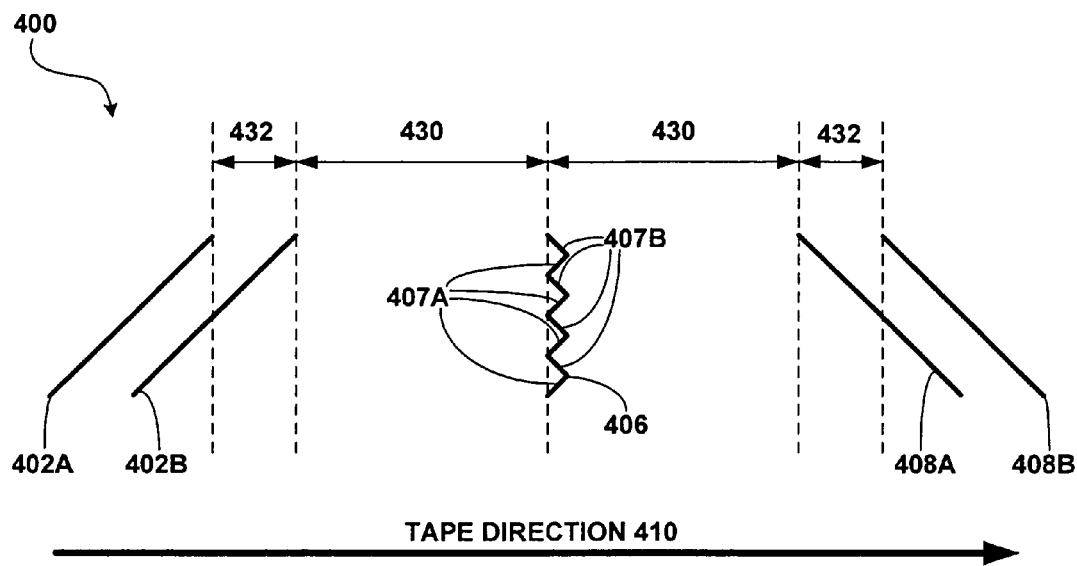
FIG. 6A illustrates a servo pattern 400 that provides an alternative to the N-shaped servo patterns.

FIG. 6A illustrates a servo pattern 400 that provides an alternative to the N-shaped servo patterns shown previously. Servo pattern 400 includes a first pair of parallel servo marks 402A and 402B ("servo marks 402"), a second pair of parallel servo marks 408A and 408B ("servo marks 408") and zigzag servo mark 406 between servo marks 402 and servo marks 408.

Zigzag servo mark 406 includes portions 407A that are parallel to the first pair of servo marks 402. Zigzag servo mark 406 also includes portions 407B that are parallel to the second pair of servo marks 408. The second pair of parallel servo marks 408 mirrors the first pair of parallel servo marks 402 relative a line perpendicular to the direction of travel 410 of a data storage tape (not shown in FIG. 6A) on which servo pattern 400 is written.

Servo pattern 400 is repeated within a servo band of a data storage tape at irregular intervals within servo frames within the servo band to encode information within the servo bands. Such an embodiment is shown as data storage tape 500 in FIG. 6A.

Figure 6B:
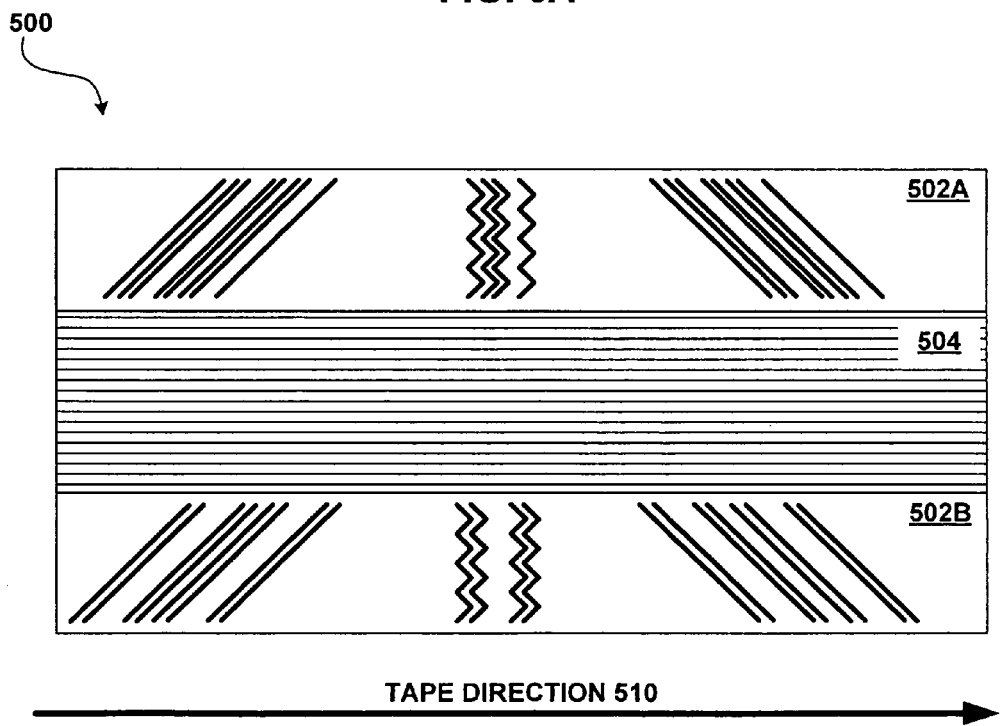
FIG. 6B illustrates data storage tape including a plurality of servo patterns from FIG. 6A, wherein spacings between the servo patterns vary to encode information.

FIG. 6B illustrates data storage tape 500, which servo bands 502A and 502B ("servo bands 502"). While only a single servo frame is shown in each of servo bands 502, servo bands 502 each include multiple servo frames. The illustrated servo frames of servo bands 502 each include four servo patterns 400. In other embodiments, more or less servo patterns 400 may be included in each servo frame of servo bands 502. For example, each servo frame of servo bands 502 may include eight servo patterns 400.

Similar to data storage tape 8 of FIG. 3, spacings between the servo patterns 400 in the servo frames of servo bands 502 vary to encode information. Furthermore, the dimensions of servo patterns 400 in servo band 502A are different from the dimensions of servo patterns 400 in servo band 502B. Specifically, spacing 432 in the servo patterns 400 in servo band 502A is smaller than spacing 432 in servo patterns 400 in servo band 502B. In this manner, spacing 432 may serve as a unique servo band identifier. Spacing 430 is the same for both servo bands 502, so spacing 430 from any servo band can be used to account for tape speed fluctuations in data storage tape 500. As examples, spacing 430 may be forty-five micrometers, while spacing 432 may by forty-five micrometers in servo band 502A and forty-five and a half micrometers in servo band 502B. In data storage tape including more than two servo bands, spacing 432 may be incremented by a half a micrometer between the servo bands to uniquely identify each of the servo bands.

Various embodiments of the invention have been described. Nevertheless, various modifications may be made without departing from the scope of the invention. For example, in some embodiments, servo patterns may be located within data tracks rather than only in servo bands adjacent to data tracks. Additionally, while techniques for encoded data in servo pattern were described for N-shaped servo patterns, other servo patterns may also be used. These and other embodiments are within the scope of the following claims.

The invention claimed is

1. A data storage tape comprising:
   one or more data tracks; and
   a servo band that stores a plurality of servo patterns within a servo frame to facilitate head positioning relative to the data tracks,
   wherein each of the servo patterns within the servo frame individually facilitate head positioning relative to the data tracks,
   wherein spacings between the servo patterns within the servo frame vary to encode information in the servo frame, wherein a number of bits in the information is greater than a number of servo patterns within the frame.

2. The data storage tape of claim 1, further comprising a plurality of servo frames that facilitate head positioning relative to the data tracks,
   wherein the servo frame is one of the plurality of servo frames, wherein the information in the servo frame is part of information encoded in the plurality of servo frames, wherein a number of bits in the encoded information in the plurality of servo frames is greater than a number of servo patterns within the plurality of servo frames.

3. The data storage tape of claim 1, further comprising a servo band, wherein the plurality of servo patterns is in the servo band.

4. The data storage tape of claim 3, wherein the plurality of servo patterns each have a substantially identical shape.

5. The data storage tape of claim 4, wherein the plurality of servo patterns were each written to the data storage tape by the same servo head.

6. The data storage of claim 4,
   wherein the plurality of servo patterns is a first plurality of servo patterns,
   wherein the servo band is a first servo band,
   wherein the substantially identical shape is a first shape,
   further comprising a second plurality of servo patterns in a second servo band of the data storage tape,
   wherein the servo patterns of the second plurality of servo patterns each have a second shape, wherein the second shape is not the same as the first shape.

7. The data storage tape of claim 6, wherein the first shape corresponds to a band identification of the first servo band and the second shape corresponds to a band identification of the second servo band.

8. The data storage tape of claim 1,
   wherein the plurality of servo patterns are divided among a plurality of servo frames,
   wherein the positions of at least two of the plurality of servo patterns in each servo frame is substantially the same in every servo frame,
   wherein, the positions of the remaining servo patterns in the plurality of servo frames vary among the servo frames to encoded data in the servo frames.

9. The data storage tape of claim 8, wherein each of the positions of the remaining servo patterns nay be located in one of eight positions to encode three bits with each of the remaining servo patterns.

10. The data storage tape of claim 8, wherein the at least two of the plurality of servo patterns in each servo frame wit positions that are substantially the same in every servo frame of the plurality of servo frames include a first servo pattern and a last servo pattern in every servo frame of the plurality of servo frames.

11. A data storage tape comprising:
    at least one data track;
    a first servo band including a first servo pattern having a first length in a direction of travel of the data storage tape, wherein the first servo band includes a plurality of servo patterns that are the same as the first servo pattern, and wherein spacing between servo patterns of the plurality of servo patterns varies to encode more than one bit of information per servo pattern; and a second servo band including a second servo pattern having a second length in the direction of travel of the data storage tape, wherein the first length identifies the first servo band and the second length identifies the second servo band.

12. The data storage tape of claim 11, wherein a position error signal calculation formula is the same for the first and the second servo patterns.

13. The data storage tape of claim 12, wherein the first servo pattern includes a first servo mark that is at a first angle relative to the direction of travel of the data storage tape, wherein the second servo pattern includes a second servo mark that is at a second angle relative to the direction of travel of the data storage tape, wherein the second servo mark is non-perpendicular to the direction of travel of the data storage tape, wherein the second angle is selected as a function of the first angle and a ratio of the first length and die second length to provide that the position error signal calculation formula is the same for the first and the second servo patterns.

14. A data storage tape comprising:

a plurality of fixed-position servo patterns that identify locations of a plurality of servo frames; and a plurality of variable-position servo patterns, wherein each of the plurality of variable-position servo patterns encode more than one bit of information according to their positions within the plurality of servo frames as defined by the plurality of fixed-position servo patterns, wherein each of the fixed-position servo patterns and each of the variable-position servo patterns individually facilitate head positioning relative to the data tracks.

15. The data storage tape of claim 14, wherein two of the plurality of fixed-position servo patterns correspond to one of the plurality of servo frames to identify the one of the plurality of servo frames.

16. The data storage tape of claim 15, wherein the two of the plurality of fixed-position servo patterns are a first servo pattern and a last servo pattern in each of the plurality of servo frames.

17. The data storage tape of claim 14, wherein each of the plurality of servo frames includes the same number of servo patterns.

18. The data storage tape of claim 14, wherein each of the plurality of a fixed-position servo patterns and the plurality of variable-position servo patterns includes a first servo mark and a second servo mark, wherein each of the first servo marks within a servo frame are immediately adjacent to each other, and wherein each of the second servo marks within a servo frame are immediately adjacent to each other.

19. A data storage tape comprising:

a plurality of fixed-position servo patterns that identify locations of a plurality of servo frames; and a plurality of variable-position servo patterns. wherein each plurality variable-position servo patterns encode more than one bit of information according their positions within the plurality of servo frames as defined by the plurality of fixed-position servo patterns, wherein each of the plurality of variable-position servo patterns way be located in one of eight positions within its servo frame such that each of the plurality of variable-position servo patterns represents three bits of information.

20. A data storage tape comprising a servo frame including a plurality of servo patterns, the servo patterns including:

a first pair of parallel servo marks;

a second pair of parallel servo marks, wherein the second pair of parallel servo marks is non-parallel to the first pair of parallel servo marks; and a zigzag servo mark, wherein the zigzag servo mark includes portions that are parallel to the first pair of servo marks and other portions that are parallel to the second pair of servo marks;

wherein spacings between the servo patterns within the servo frame vary to encode information in the servo frame, wherein a number of bits in the information is greater than a number of servo patterns within the frame.

21. The data storage tape of claim 20, wherein the second pair of parallel servo marks mirrors the first pair of parallel servo marks relative a line perpendicular to a direction of travel of the data storage tape.

22. The data storage tape of claim 20, wherein the zigzag servo mark is located between the first pair of parallel servo marks and the second pair of parallel servo marks.

* * * * *

UNITED STATES PATENT AND TRADEMARK OFFICE
CERTIFICATE OF CORRECTION

PATENT NO. : 7,538,969 B2
APPLICATION NO. : 11/508508
DATED : May 26, 2009
INVENTOR(S) : Mark F. Weber and Alan R. Olson It is certified that error appears in the above-identified patent and that said Letters Patent is hereby corrected as shown below:

Column 10
  Line 57, "wit" should read --with--.

Column 11
  Line 22, "die" should read --the--.

Column 12
  Line 14, "each plurality variable-position" should read --each of the plurality of variable-position--.
  Line 15, "according their" should read --according to their--.
  Line 20, "way" should read --may--.

Signed and Sealed this

Twenty-second Day of September, 2009

David J. Kappos
*Director of the United States Patent and Trademark Office*